UNITED STATES PATENT OFFICE.

CHARLES BRANDENBURG, OF NEW YORK, N. Y.

COMPOSITION FOR PRESERVING WOOD AND COATING OIL-BARRELS.

Specification forming part of Letters Patent No. 46,873, dated March 21, 1865.

*To all whom it may concern:*

Be it known that I, CHARLES BRANDENBURG, of the city, county, and State of New York, have invented a new and useful Improvement in Compositions for Coating Barrels and other Vessels; and I do hereby declare that the following is a full, clear, and exact description thereof, which will enable others skilled in the art to make and use the same.

The object of my invention is to protect and preserve all kinds of wood from decay, and also to prevent the loss of the liquid contents of barrels and other vessels, especially when the said barrels are intended for the transportation or shipment of petroleum, naphtha, alcohol, and other liquids of a pungent, penetrating, thin, and easily-evaporative character.

My improved compound is to be applied to the inner surface of the barrel or vessel.

My improved compound is made in the following manner:

I take one gallon linseed-oil and raise it to the boiling-point, when I mix and boil therein for a short time one-half a pound of black oxide manganese. I then bring up the heat of the mass to 450° Fahrenheit, which is maintained for eight or nine hours, when it thickens, and I allow it to cool. I then pour in and mix with the mass two and one-half pints of benzine. The mixture thus produced I denominate "oil of manganese." I make another mixture composed of one part of plumbago, one part of hydraulic lime, and six parts of sulphate of lime. I make another mixture composed of one ounce of caoutchouc dissolved in methylic alcohol. I then evaporate the alcohol from the mixture and add thereto one pint of benzine.

In order to coat the interior of a vessel—a forty-gallon barrel, for example—I take seven-eighths of a pint of my oil of manganese, to which I add one-third of an ounce of the mixture of plumbago, lime, and plaster-of-paris, together with enough of the caoutchouc mixture to render the mass suitably liquid. I then pour the whole into the barrel to be coated and roll it about until every part has been covered with the mixture and withdraw the surplus. The barrel, after standing twenty-four hours, or longer if the atmosphere is humid, will be ready for use, and will be thoroughly protected against the penetrative action of petroleum, naphthas, kerosene, alcohols, and analogous fluids.

In order to preserve and protect all kinds of wood from decay, in the use of my improved compound as a paint, simply applying the compound to the surfaces of the wood with a brush or other suitable device; or I soak the wood in the compound.

Having thus described my invention, I claim as new and desire to secure by Letters Patent—

The within-described compound for preserving wood and coating barrels and other vessels.

CHARLES BRANDENBURG.

Witnesses:
 HENRY HESSLER,
 E. GUSTAV JAHR.